(12) United States Patent
Volkmer et al.

(10) Patent No.: US 9,486,724 B2
(45) Date of Patent: Nov. 8, 2016

(54) FILTER DEVICE, IN PARTICULAR LIQUID FILTER

(71) Applicant: MANN+HUMMEL GMBH, Ludwigsburg (DE)

(72) Inventors: Daniel Volkmer, Hemmingen (DE); Pius Trautmann, Stuttgart (DE); Elke Duerr, Asperg (DE); Guenter Jokschas, Murrhardt (DE); Elisabeth Nissler, Weinstadt (DE); Marco Schweikart, Marbach (DE); Dieter Schreckenberger, Marbach (DE); Sven Epli, Heilbronn (DE); Oliver Glueck, Stuttgart (DE); Stefan Eichinger, Gerlingen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 223 days.

(21) Appl. No.: 13/713,869

(22) Filed: Dec. 13, 2012

(65) Prior Publication Data
US 2013/0098824 A1    Apr. 25, 2013

Related U.S. Application Data

(63) Continuation of application No. PCT/EP2011/058785, filed on May 30, 2011.

(30) Foreign Application Priority Data

Jun. 14, 2010   (DE) .................. 10 2010 023 650

(51) Int. Cl.
| | | |
|---|---|---|
| *F02M 37/22* | (2006.01) | |
| *B01D 35/00* | (2006.01) | |
| *B01D 17/00* | (2006.01) | |
| *B01D 17/04* | (2006.01) | |
| *B01D 29/21* | (2006.01) | |
| *B01D 29/92* | (2006.01) | |
| *B01D 36/00* | (2006.01) | |

(52) U.S. Cl.
CPC ............ *B01D 35/005* (2013.01); *B01D 17/04* (2013.01); *B01D 17/10* (2013.01); *B01D 29/21* (2013.01); *B01D 29/925* (2013.01); *B01D 36/003* (2013.01); *F02M 37/221* (2013.01); *B01D 2201/0415* (2013.01); *B01D 2201/291* (2013.01); *B01D 2201/305* (2013.01); *B01D 2201/316* (2013.01); *B01D 2201/32* (2013.01)

(58) Field of Classification Search
None
See application file for complete search history.

(56) References Cited

U.S. PATENT DOCUMENTS

| | | | |
|---|---|---|---|
| 4,384,962 A * | 5/1983 | Harris | 210/788 |
| 6,554,139 B1 | 4/2003 | Maxwell | |
| 2002/0157999 A1* | 10/2002 | Baracchi | B01D 17/045 210/299 |
| 2008/0135469 A1 | 6/2008 | Fremont | |
| 2011/0006017 A1* | 1/2011 | Wieczorek et al. | 210/806 |

FOREIGN PATENT DOCUMENTS

EP          0405447 A2    1/1991

\* cited by examiner

*Primary Examiner* — Benjamin Kurtz
(74) *Attorney, Agent, or Firm* — James Hasselbeck

(57) ABSTRACT

A filter device has, in a housing, a filter element and, downstream of the filter element, an outflow opening for discharging the cleaned medium. Between the filter element and the outflow opening there is arranged a diverting part, wherein on the diverting part there is formed an overflow region for the flow of the medium from the filter element to the outflow opening, and the outflow opening is situated at the same level as or below the overflow region.

10 Claims, 2 Drawing Sheets

FILTER DEVICE, IN PARTICULAR LIQUID FILTER

CROSS REFERENCE TO RELATED APPLICATIONS

This application is US Bypass Continuation of international patent application no. PCT/EP2011/058785, filed May 30, 2011 designating the United States of America, the entire disclosure of which is incorporated herein by reference. Priority is claimed based on German patent application no. DE 10 2010 023 650.0, filed Jun. 14, 2010.

TECHNICAL FIELD

The invention concerns a filter device, in particular a liquid filter.

BACKGROUND

DE 101 23 190 A1 discloses a fuel filter with means for separating water. The filter is of a two-stage configuration with two cylindrical filter elements inserted into each other through which, in radial direction, fuel is flowing wherein the upstream filter element is comprised of hydrophilic material and downstream filter element is comprised of hydrophobic material. After flowing through the first hydrophilic filter, the purified fuel, including water proportions, reaches the outer mantle surface of the second hydrophobic filter where the water is separated and is guided in axial direction downward.

WO 2008/077954 A2 discloses a fuel filter that comprises an annular filter element to be flowed through in radial direction from the exterior to the interior as well as a mesh element that is also annular and is received in the filter element. The fuel is first passed through the filter element in radial direction for particle filtration and, before flowing into the mesh element, must first flow across the bottom edge of a housing insert which serves for diverting the fuel. In the area of the lower end face edge of the housing insert, a first water separation takes place, followed by a second water separation on the mesh element.

The invention has the object to provide a filter device with improved efficiency with respect to separating particles or entrained medium.

SUMMARY OF THE INVENTION

The filter device according to the invention relates preferably to liquid filters, in particular fuel filters such as filter devices for diesel fuel or gasoline or optionally also oil filters in internal combustion engines. In such liquid filters, for example, water that is contained in the fuel or oil is filtered out and is discharged from the filter device. In principle, also an application in filter devices for filtration of gaseous fluids is conceivable, for example, air filters for internal combustion engines where also preferably entrained liquid, in general water, is separated by means of the filter device.

The filter device according to the invention comprises a filter element in a housing wherein upstream of the filter element an outflow opening for discharging the purified medium is arranged. Between the filter element and the outflow opening, there is a diverting part that is preferably flow-tight and on which an overflow region for the flow of the purified medium from the filter element to the outflow opening is formed. The upper edge of the outflow opening is positioned relative to the diverting part at the same level or below the overflow region at the diverting part.

With this configuration, it is ensured that the flow of the pre-purified medium between the clean side of the filter element and the outflow opening, relative to the regular mounted position in which fluid flows through the filter element or the filter element is flowed through across its axial height, is realized with a downwardly oriented component, i.e., with a component in the direction of the weight force vector. This has the advantage that the flow is not opposite to the weight force of the particles to be separated but is oriented in the same direction so that the degree of separation is improved. When, for example, entrained water is to be separated from the fuel or oil, as a result of the inventive relative position of overflow region at the diverting part and outflow opening, downwardly oriented flow components are provided downstream of the overflow region and are guided to the outflow opening so that the sedimentation direction of the water droplets and the main flow direction are at least oriented in the direction of the force of gravity, respectively. The water droplets, before exiting through the outflow opening, will deposit within a separating chamber in the housing of the filter device and can be drained from it.

In embodiments of the prior art, in which the flow that is containing the water particles is guided upwardly in the direction toward the outflow opening, separation of the water droplets is not possible when the sedimentation speed is smaller than the flow speed. In this case, the water droplets are entrained within the upwardly oriented flow. In the embodiment according to the invention, however, the ratio of the sedimentation speed to the flow speed plays no decisive role in the separation so that the degree of separation is significantly improved.

Achieved for the downwardly oriented flow by the diverting part or the overflow region at the diverting part, which has the advantage that at the filter element itself no modifications are required. Accordingly, filter elements can be used without any change or modifications.

The overflow region at the diverting part is either in the form of a recess in the diverting part or, according to a preferred embodiment, is formed immediately on the end face or end face edge of the diverting part. For example, the diverting part is embodied as a blockade wall whose upper end face edge forms the overflow region or delimits it. The blockade wall is positioned within the flow area between the clean side of the filter element and the discharge opening and forces the flow that has passed the filter element to be deflected in order to achieve the desired flow from the diverting part with the downwardly oriented component toward the outflow opening. This has moreover the advantage that the filter element, across its entire axial height, can be flowed through by the fluid to be purified because only in the area of the clean side the flow diversion at the diverting part is realized.

The diverting part can be resting either immediately on the clean side of the filter element or at a spacing relative to the clean side, wherein the latter embodiment has the advantage that the radial flow through the filter element is without impairment so that across the entire axial height and across the entire radial thickness of the filter element a uniform flow vector that extends in radial direction from the exterior to the interior is provided. Only after exiting via the clean side of the filter element, the diverting action along the wall side of the diverting part that is facing the clean side of the filter element is realized. Upon reaching the overflow region at the end face edge of the diverting part, a flow direction with a component in the direction of the weight force vector is adjusted as a result of the pressure conditions.

The embodiment with a diverting part that is immediately resting at the clean side of the filter element has, on the other hand, the advantage of a space-saving arrangement because in particular the annular space between the clean side of the filter element and the outflow opening can be kept relatively small.

The filter device according to the invention relates in particular to annular filter elements which are flowed through radially from the exterior to the interior. However, in principle an embodiment of the filter element is possible, for example, as a planar filter plate. In case of an annular configuration of the filter element, the diverting part is expediently also of an annular shape while in a planar or plate-shaped filter element the diverting part is also embodied as a planar blockade wall which either is positioned immediately at the clean side of the filter element or at a spacing thereto.

Expediently, the filter element is supported on a support part, for example, a support frame which is in particular arranged at the clean side of the filter element. In the annular embodiment of the filter element, the support part forms a cylinder at the inner side of the filter element.

In principle, embodiments are conceivable in which the diverting part is embodied separate from the support part, as well as embodiments in which the diverting part is embodied monolithically with the support part. In the separate embodiment, the diverting part is expediently arranged at a spacing to the clean side of the filter element. In the monolithic embodiment, it is however expedient that the support part at the same time forms the diverting part, in particular in such a way that the lower section that is adjacent to the bottom is formed monolithically without flow openings wherein this section extends only across a partial axial height of the filter element so that the upper end face edge of this section that is of a closed embodiment forms the overflow region across which the flow that is exiting from the clean side of the filter element can flow. The section of the support part positioned above is however provided with flow openings for outflow of the medium that passes through the filter element.

According to a further expedient embodiment, it is provided that between the diverting part and the outflow opening a separation component for the particles or droplets to be separated is formed. The separation component serves for separation of the particles or droplets which, after having passed the filter element, are still contained in the fluid flow. The separation component is, for example, embodied as a screen, in particular of a hydrophobic material or provided with a hydrophobic coating so that the medium to be purified can pass through the openings in the screen and the particles or droplets to be separated are retained at the screen wall and flow into the collecting chamber. Downstream of the screen the outflow opening is provided through which the purified fluid that has been freed of the particles or droplets to be separated can flow out.

In a preferred embodiment, between the filter element and the support frame a coalescence medium is arranged which joins the water droplets contained in the fuel to larger droplets.

The collecting chamber for the particles or droplets to be separated is located preferably below the outflow opening and is provided with a drain opening for draining the separated particles or droplets.

BRIEF DESCRIPTION OF THE DRAWINGS

Further advantages and expedient embodiments are disclosed in the further claims, the figure description, and the drawings. It is shown in:

In the Figures, the same components are provided with the same reference numerals.

DETAILED DESCRIPTION

Figure 1:
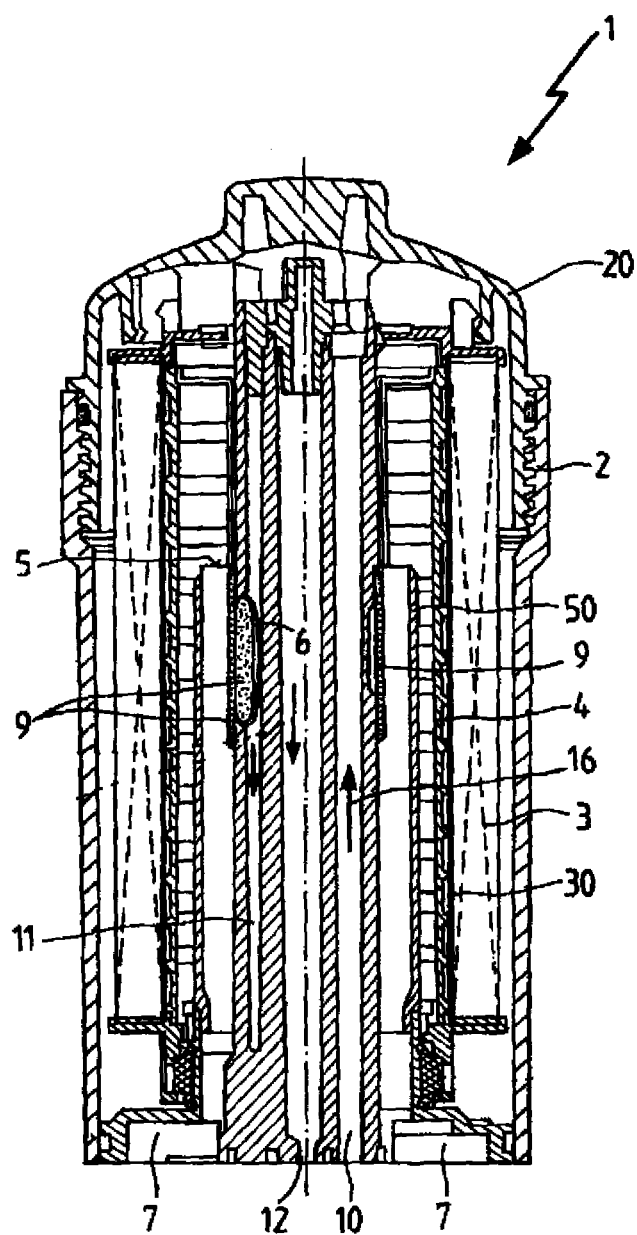
FIG. 1 a view of a liquid filter in section view.

In FIG. 1, a liquid filter for an internal combustion engine is illustrated, in particular a fuel filter. The fluid to be filtered enters through an inlet passage 10 from below into the liquid filter 1 and flows in the direction of arrow 16 through the inlet passage 10 that is arranged in a channel component at the center of the liquid filter in upward direction.

The liquid filter 1 has further in the cylindrical housing 2 an annular filter element 3 that is flowed through by the liquid radially from the exterior to the interior by the medium to be purified. The material of the filter element 3 is supported by a support frame 4 that is arranged at the radial inner side and is preferably made of plastic material. The radial inner side of the filter element 3 forms the clean side, the radial outer side the raw side. In a preferred embodiment between the filter element 3 and the support frame 4 a coalescence medium 30 is arranged which coalesces the water droplets contained in the fuel to larger droplets. Alternatively, on the filter medium of the filter element 3 a coalescence layer can be applied. The support frame 4 is provided with cutouts through which the flow that has passed the filter element can enter the interior of the support frame 4.

In the interior surrounded by the annular filter element 3 there is an outflow opening 6 through which the fluid exiting form the clean side of the filter element can be discharged from the filter 1 into the outlet passage 11. In order to ensure a flow direction of the purified fluid from the top to the bottom in the direction of the weight force vector, within the support frame 4 a diverting part 50 in the form of an annular blockade wall is arranged. The diverting part 50 extends in this case at least to the upper edge of the outflow opening 6, preferably however past it in order to ensure the flow of the fluid in downward direction toward the bottom. The upper end face edge of the diverting part 50 is located in the upper half of the filter element, relative to the entire axial height of the filter element. The upper end face edge of the diverting part 50 forms in this connection an overflow region 5 across which the flow that is exiting from the filter element is guided in downward direction toward the outflow opening 6.

The diverting part can be alternatively integrated also into the support groove 4 (not shown in FIG. 1) and for this purpose the support frame 4 is partially of a closed configuration, viewed across its axial height, namely from the bottom of the filter device to the level of the outflow opening 6.

The entrained water droplets in the fuel which have passed the filter element 3 are separated before discharge through the outflow opening 6 within the diverting part 50 and can flow into the lower area of the filter device in which a collecting chamber with a drain opening 7 for discharging the collected water is provided. Preferably, for an improved water separation a separation screen 9 is arranged upstream of the discharge opening 6; it is preferably hydrophobic and prevents the water droplets from entering the outflow opening. This is in particular facilitated in that the water droplets will not impinge perpendicularly onto the separation screen 9 but, as a result of the flow deflection, at an acute angle so that the water droplets are not pressed by a head-on inflow through the separation screen 9.

The outflow opening 6 is positioned at a radial spacing to the clean side of the filter element 3 or to the inner side of the support frame 4 and of the diverting part 50. Between the discharge opening 6 and diverting part 50 the separated water can sink in downward direction to the drain opening 7. This intermediate space is connected by a drain bore with the tank return and venting passage 12 at the center of the liquid filter.

Figure 2:
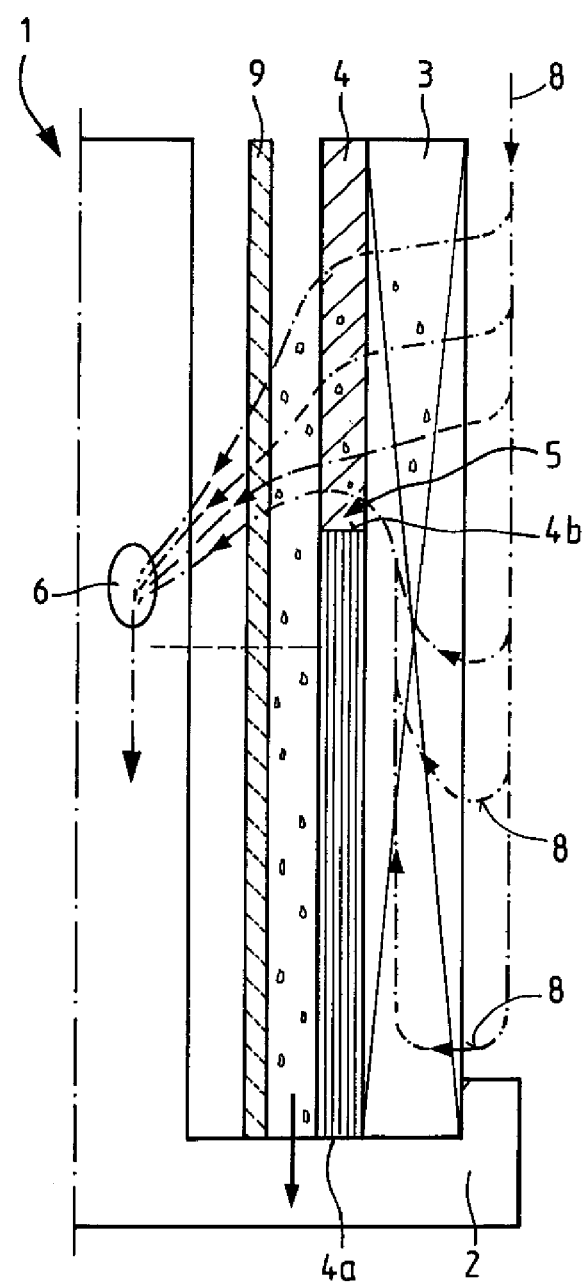
FIG. 2 a schematic illustration of a liquid filter, also in section.

FIG. 2 shows also a filter device 1 with a filter element 3 arranged in a filter housing 2. The filter element 3 is of an annular configuration wherein optionally also a planar or plate-shaped configuration may be conceivable. At the inner flow side the filter element 3 is secured by a support frame 4 whose lower part 4a is closed and forms a diverting part in the form of a blockade wall. The medium that flows through the filter element 3 in radial direction from the exterior to the interior, as indicated by the flow arrows 8, can flow at the wall side of the diverting part 4a that is facing the filter element 3 axially up to the overflow region 5 that is located at the upper end face edge of the diverting part. Only at a position axially above the upper end face edge, the flow is able to exit via the clean side of the filter element. The end face edge with the overflow region 5 is positioned axially at least at the same level, preferably however slightly higher than the outflow opening 6 which is positioned downstream of the filter element.

For improving the separation of the entrained water particles, a separation screen 9 is provided that is arranged upstream of the support frame 4 inclusive of the diverting part 4a and the outflow opening 6 wherein the separation screen 9 is arranged at a spacing relative to the diverting part as well as to the outflow opening. The separation screen 9 is hydrophobic so that the separation effect is improved and the water particles entrained in the flow 8 are separated on the outflow side of the separation screen 9 whereupon the separated water droplets can flow in downward direction into the collecting chamber and from there by means of the drain opening out of the filter device.

We claim:

1. A filter device, comprising:
   a filter element to filter a medium, the filter element having a dirty side and a clean side and a top axial end and opposing bottom axial end;
   a filter housing into which the filter element is received, the filter housing including
      an outflow channel member enclosing an axially extending outflow passage, the outflow channel member and passage extending axially into an interior of the filter element, the outflow passage for filtered fluid to leave the filter device;
      an outflow opening extending radially through a wall of the outflow channel member into the outflow passage, the outflow opening arranged downstream of the filter element discharging purified medium into the outflow passage of the outflow channel member, the outflow opening having an upper edge;
      wherein the outflow opening is arranged within the interior of the filter element and spaced axially inwardly away from the top and the bottom axial ends of the filter element;
   a diverting part is arranged between the filter element and the outflow opening;
   wherein the diverting part extends axially upwardly away from the bottom axial end and terminates at a diverting part upper end positioned below the top axial end of the filter element;
   wherein the diverting part is embodied an annular blockade wall having an annular upper end face edge spaced radially outwardly from and extending circumferentially around the outflow channel member;
   wherein the overflow region is formed at the annular upper end face edge of the annular blockade wall;
   wherein, as the diverting part terminates below the top axial end of the filter element, open space starting at the annular upper end face edge and below the top axial end of the filter element forms the overflow region permitting flow to flow over the annular upper end face edge of the diverting part from the clean side of the filter element to the outflow opening;
   wherein the outflow opening is spaced radially inwardly away from a radial inner side of the diverting part;
   wherein the outflow channel member radially completely encloses the axially extending outflow passage from the bottom axial end of the filter element UP to the outflow opening, allowing fluid flow to enter the outflow passage only at the outflow opening and
   wherein the outflow opening is arranged at or near the annular upper end face edge and away from the bottom axial end of the filter element, wherein the upper edge of the outflow opening is arranged at the same axial height or slightly below the overflow region.

2. The filter device according to claim 1, wherein the diverting part is spaced apart from the clean side of the filter element.

3. The filter device according to claim 1, wherein the diverting part is positioned immediately at the clean side of the filter element.

4. The filter device according to claim 1, wherein the filter element is secured on a support part; and
   wherein the diverting part is formed separate from the support part.

5. The filter device according to claim 1, wherein the filter element is secured directly onto a support part; and
   wherein the diverting part is formed monolithically with the support part as a one-piece unitary component.

6. The filter device according to claim 1, wherein a separation component for particles or droplets to be separated is arranged between the diverting part and the outflow opening.

7. The filter device according to claim 6, wherein the separation component is embodied as a screen.

8. The filter device according to claim 1, wherein a drain opening draining separated droplets is arranged below the outflow opening.

9. The filter device according to claim 1, wherein the filter element and the diverting part each are of an annular configuration.

10. A filter device, comprising:
    a filter element to filter a medium, the filter element having a dirty side and a clean side and a top axial end and opposing bottom axial end;
    a filter housing into which the filter element is received, the filter housing including
       an outflow channel member formed as an axially extending annular wall circumferentially enclosing within an axially extending outflow passage, the outflow channel member and passage extending axially into an interior of the filter element, the outflow passage for filtered fluid to leave the filter device;
       an outflow opening extending radially through the annular wall of the outflow channel member into the outflow passage, the outflow opening arranged downstream of the filter element discharging purified medium into the outflow passage of the outflow channel member, the outflow opening having an upper edge;

wherein the outflow opening is arranged within the interior of the filter element and spaced axially inwardly away from the top and the bottom axial ends of the filter element;

a tubular diverting part is arranged between the filter element and the outflow opening;

wherein the tubular diverting part is embodied an annular blockade wall having an annular upper end face edge spaced radially outwardly from and extending circumferentially around the outflow channel member;

wherein an overflow region is formed at the annular upper end face edge of the annular blockade wall;

wherein the tubular diverting part extends axially upwardly away from the bottom axial end and terminates at the annular upper end face edge positioned below the top axial end of the filter element;

wherein, open space starting at the annular upper end face edge and below the top axial end of the filter element forms the overflow region permitting flow to flow over the annular upper edge of the tubular diverting part from the clean side of the filter element to the outflow opening;

wherein the outflow channel member radially completely encloses the axially extending outflow passage from the bottom axial end of the filter element UP to the outflow opening, allowing fluid flow to enter the outflow passage only at the outflow opening;

a separation component for particles or droplets to be separated is arranged between the tubular diverting part and the outflow opening of the outflow channel member;

wherein the separation component is radially spaced apart from both the diverting part and the outflow channel member;

wherein the outflow opening is arranged at or near the annular upper end face edge and away from the bottom axial end of the filter element, wherein the upper edge of the outflow opening is arranged at the same axial height or slightly below the overflow region.

* * * * *